US012785497B1

(12) United States Patent
Shaw et al.

(10) Patent No.: US 12,785,497 B1
(45) Date of Patent: Nov. 3, 2026

(54) METHOD AND APPARATUS FOR OPTIMAL POSITIONING OF ROTOR AND STATOR IN AN AXIAL FLUX MACHINE

(71) Applicant: E-Circuit Motors, Inc., Needham Heights, MA (US)

(72) Inventors: Steven Robert Shaw, Bozeman, MT (US); George Harder Milheim, Bozeman, MT (US); Eric Ponce, Belgrade, MT (US)

(73) Assignee: E-Circuit Motors, Inc., Needham Heights, MA (US)

( * ) Notice: Subject to any disclaimer, the term of this patent is extended or adjusted under 35 U.S.C. 154(b) by 0 days.

(21) Appl. No.: 19/441,175

(22) Filed: Jan. 6, 2026

Related U.S. Application Data

(60) Provisional application No. 63/900,501, filed on Oct. 16, 2025.

(51) Int. Cl.
*H02K 7/00* (2006.01)
*H02K 1/12* (2006.01)
*H02K 1/22* (2006.01)

(52) U.S. Cl.
CPC ................. *H02K 7/00* (2013.01); *H02K 1/12* (2013.01); *H02K 1/22* (2013.01)

(58) Field of Classification Search
CPC .. H02K 7/00; H02K 1/12; H02K 1/22; H02K 1/2793; H02K 21/026
USPC ........................................................ 310/75 R
See application file for complete search history.

(56) References Cited

U.S. PATENT DOCUMENTS

| | | | | |
|---|---|---|---|---|
| 6,348,751 | B1 * | 2/2002 | Jermakian ................. | B60L 7/14 310/179 |
| 7,109,725 | B2 | 9/2006 | Maurice | |
| 9,773,788 | B1 | 9/2017 | Juengling | |
| 9,800,109 | B2 | 10/2017 | Shaw | |
| 10,170,953 | B2 | 1/2019 | Shaw | |
| 10,211,794 | B1 | 2/2019 | Zhu et al. | |
| 11,005,322 | B2 | 5/2021 | Milheim et al. | |
| 11,121,714 | B2 | 9/2021 | Gans | |
| 11,336,130 | B1 | 5/2022 | Shaw et al. | |
| 11,627,933 | B2 | 4/2023 | Zhang et al. | |
| 11,726,879 | B2 | 8/2023 | Brown et al. | |
| 11,851,330 | B2 | 12/2023 | Kang et al. | |
| 12,438,426 | B2 | 10/2025 | Yao et al. | |
| 2022/0329132 | A1 * | 10/2022 | Guedes-Pinto .......... | H02K 9/19 |
| 2023/0412057 | A1 | 12/2023 | Jang et al. | |
| 2024/0235351 | A9 | 7/2024 | Raber et al. | |

FOREIGN PATENT DOCUMENTS

| | | | |
|---|---|---|---|
| DE | 102023123471 | A1 | 3/2025 |
| WO | 2022023145 | A1 | 2/2022 |
| WO | 2024105487 | A1 | 5/2024 |

* cited by examiner

*Primary Examiner* — Alexander A Singh
(74) *Attorney, Agent, or Firm* — Pierce Atwood LLP

(57) ABSTRACT

In accordance with one example method, at least a first operational parameter of a rotary energy conversion device may be measured, and a value of a function that is based at least in part on the first operational parameter may be determined. A relative position of a rotor component and a stator component of the rotary energy conversion device may be adjusted until the value is substantially equal to a local extremum of the function.

28 Claims, 8 Drawing Sheets

METHOD AND APPARATUS FOR OPTIMAL POSITIONING OF ROTOR AND STATOR IN AN AXIAL FLUX MACHINE

RELATED APPLICATIONS

This application claims the benefit under 35 U.S.C. § 119 (e) of U.S. Provisional Application Ser. No. 63/900,501, entitled METHOD AND APPARATUS FOR OPTIMAL POSITIONING OF ROTOR AND STATOR IN AN AXIAL FLUX MACHINE, filed Oct. 16, 2025, the entire contents of which are incorporated herein by reference for all purposes.

BACKGROUND

Axial flux motors and generators described by several patents, including U.S. Pat. Nos. 7,109,725; 9,773,788; 9,800,109; 10,170,953; 10,211,794; 11,005,322; 11,121,714; 11, 336,130; 11,627,933; 11,726,879; 11,851,330, the entire contents of which are incorporated herein by reference, feature a generally planar printed circuit board (PCB) stator assembly interposed between magnets magnetized with alternating north-south poles.

DETAILED DESCRIPTION

Figure 1:
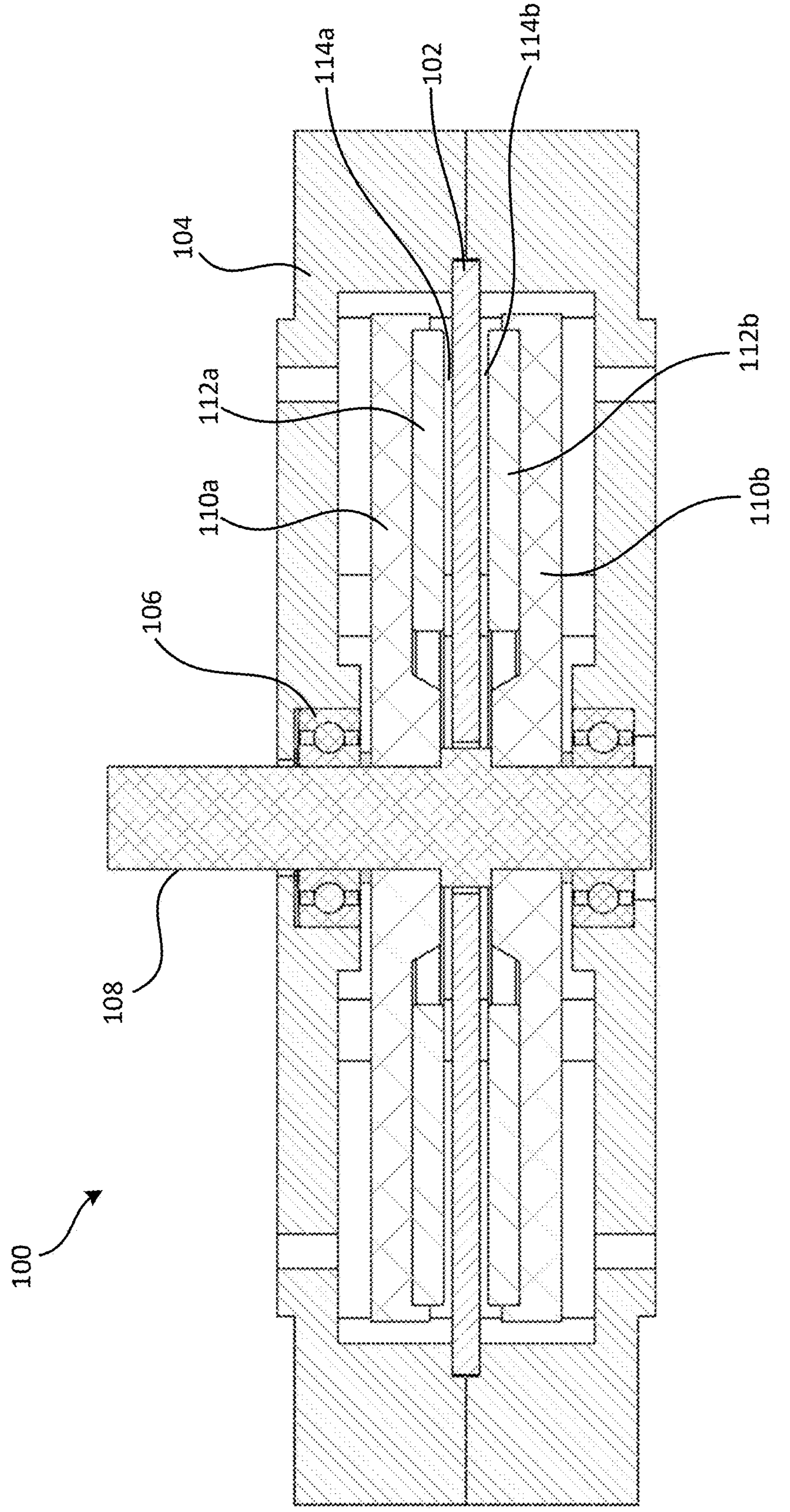
FIG. 1 shows a cross-section of a typical printed circuit board stator axial flux machine, e.g., a motor or a generator, with the stator centered in the gap between rotors.

FIG. 1 illustrates a conventional axial flux machine 100 in which a PCB stator 102 is held stationary with respect to a housing 104 and bearings 106 allow a rotor (including a shaft 108, back iron components 110, and magnets 112) to rotate relative to the housing 104. In such machines, as illustrated in FIG. 1, the PCB stators 102 are commonly interposed between magnets 112*a*, 112*b* that are supported by respective back iron components 110*a*, 110*b*. Alternatively, in some such machines, the back iron component 110 on one side of the PCB stator 102 may not include any magnets. As used herein, the term "rotor component" refers to a given back iron component 110 and its associated magnet(s) 112, if any, that are disposed on one side of a stator (e.g., the PCB stator 102). Often, as shown in FIG. 1, the configuration in a motor or generator involves an axially arranged sequence including a first rotor component (e.g., the back iron components 110*a* and the magnets 112*a*), a first gap 114*a*, a stator (e.g., the PCB stator 102), a second gap 114*b*, and a second rotor component (e.g., the back iron component 110*b* and the magnets 112*b*). The spacing between the rotor components and the stator (e.g., the PCB stator 102) in practical energy conversion devices is established by the design and tolerances of the shaft 108, the bearings 106, and the housing 104.

The present disclosure describes methods and apparatuses can be used to "center" a stator (e.g., the PCB stator 102 shown in FIG. 1) between rotor components in the face of manufacturing variations, tolerance stack up, and other confounding factors to optimize the mechanical clearances and potentially optimize the efficient operation a printed circuit board stator machine. In some implementations, the techniques disclosed herein can be employed to automate the assembly of motors without the need for single-use ports or other special housing features. Further, quantities and measurements are disclosed that can be advantageously used to "center" rotors, e.g., in the sense of minimizing drag and/or other parameters, as opposed to finding the geometric "center" in which the gaps between the stator and rotor are made equal. Advantages include increased efficiency, avoidance of rotor/stator collisions, and potential cost savings in reducing the tolerance requirements of parts, such as the housing 104.

Although the techniques described herein are disclosed primarily in terms of a printed circuit stator axial flux machine, it should be appreciated that they may alternatively be applied, in at least some cases, to axial flux machines of other kinds of construction.

Figure 2:
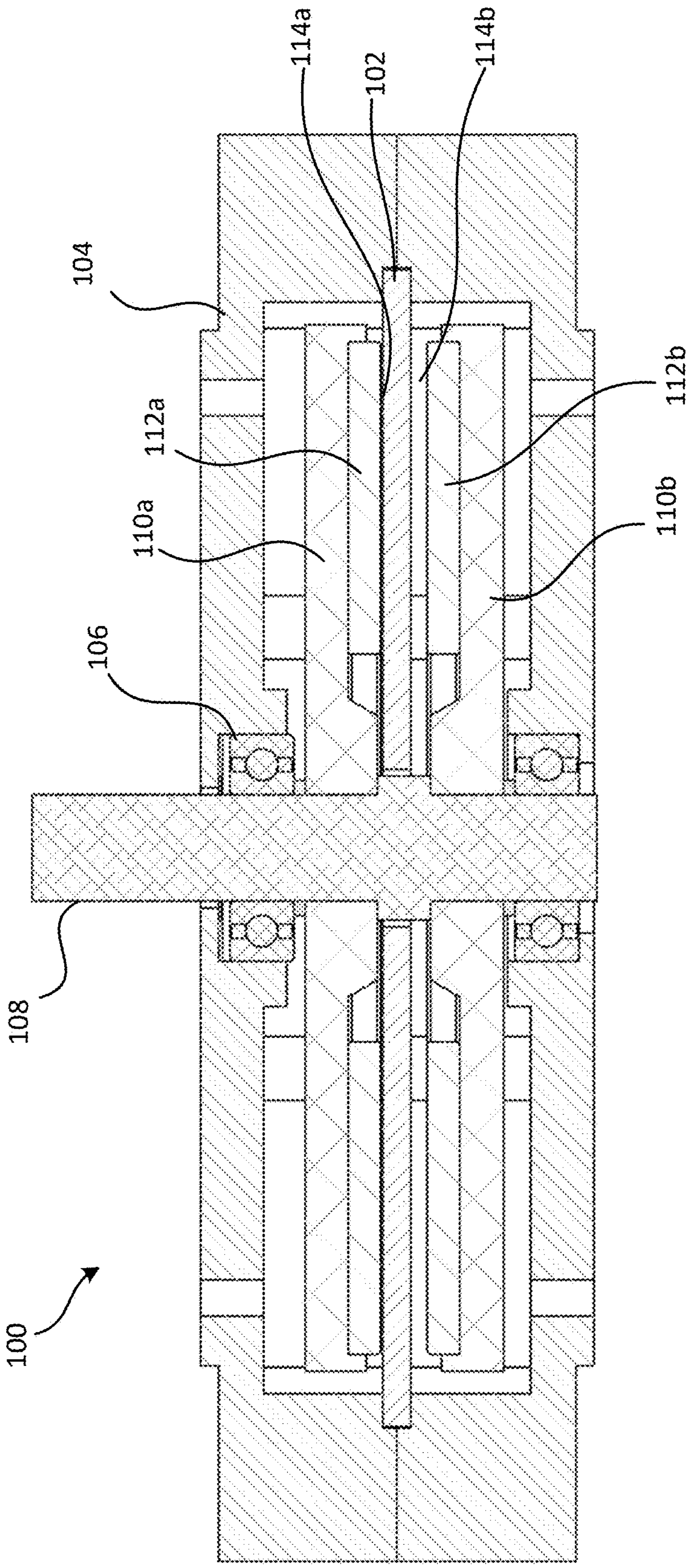
FIG. 2 shows a cross-section of a printed circuit board stator axial flux machine in which the rotors are displaced to a mechanical limit, i.e., in contact with the stator.

The basic requirement for positioning the rotor components and stator in an axial flux machine is relatively simple—there cannot be a collision during operation. FIG. 2 shows this possibility in an axial flux machine 100 of the type shown in FIG. 1, where the upper rotor component is too close to the PCB stator 102, thus closing the gap 114*a* and causing the magnets 112*a* to collide with an upper surface of the PCB stator 102.

Figure 3:
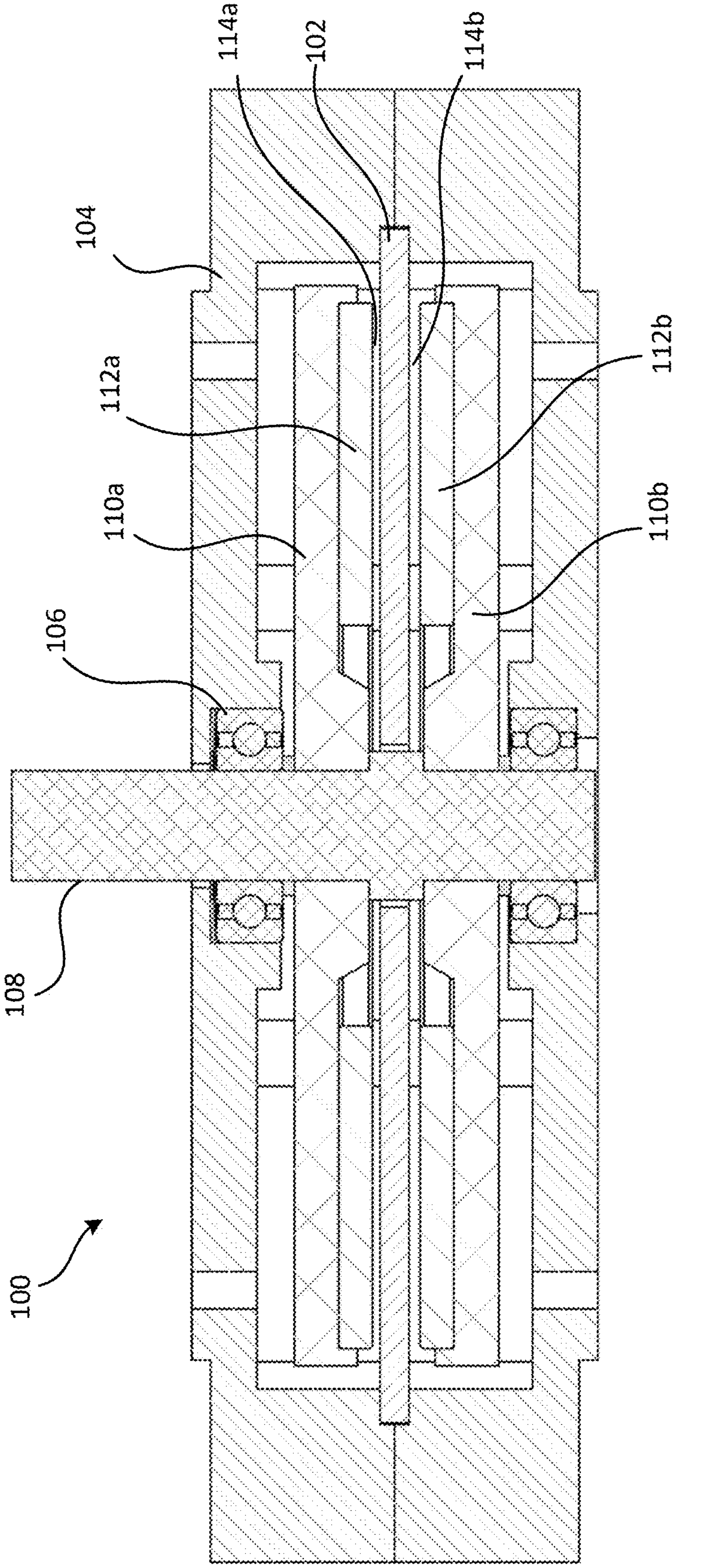
FIG. 3 shows a cross-section of a printed circuit board stator axial flux machine, in which there is no mechanical interference, but the stator is not geometrically centered in the gap.

Even if such an axial flux machine is manufactured so that there is no collision, a stator (e.g., a PCB stator 102) that is significantly off-center in the gap between rotor components can have undesirable impacts on performance. Such a circumstance is illustrated in FIG. 3, where the components of the axial flux machine 100 are arranged such that the size of the first gap 114*a* between the magnets 112*a* and an upper surface of the PCB stator 102 is smaller than the size of second gap 114*b* between the magnets 112*b* and a lower surface of the PCB stator 102. Such asymmetry between the gap sizes may lead to increases in losses and/or drag from nominal values and/or may result in a collision condition resulting from expansion or contraction when the axial flux machine 100 heats or cools. There may also be circumstances where the axial separation between one the rotor components and the stator is insufficient to preserve electrical isolation between an energized stator and rotor components. This phenomenon can contribute to bearing failure and reduce the safe and effective operating lifetime of the machine. Further, in a permanent magnet machine featuring a stator with a magnetically susceptible core, the axial force (on both the rotor components and the stator) may increase significantly if the rotor components are displaced from their nominal design location.

One technique for maintaining proper rotor/stator geometry is to manufacture all components to close tolerances, such that a properly assembled machine has a symmetric gap falling within acceptable design tolerances, such as illustrated in FIG. 1. Unfortunately, when multiple parts are involved, these tolerance requirements on individual parts can be very tight. This drives up costs. Further, when the machine is assembled and contained within a protective chassis, it is difficult to measure or otherwise ascertain that the rotor-stator gap is acceptable. Assemblers may resort to physically feeling for signs of rotor/stator collision on a fully assembled motor. This is not a realistic solution—as noted, the position of the rotor/stator can be problematic even in the absence of physical contact.

Figure 4:
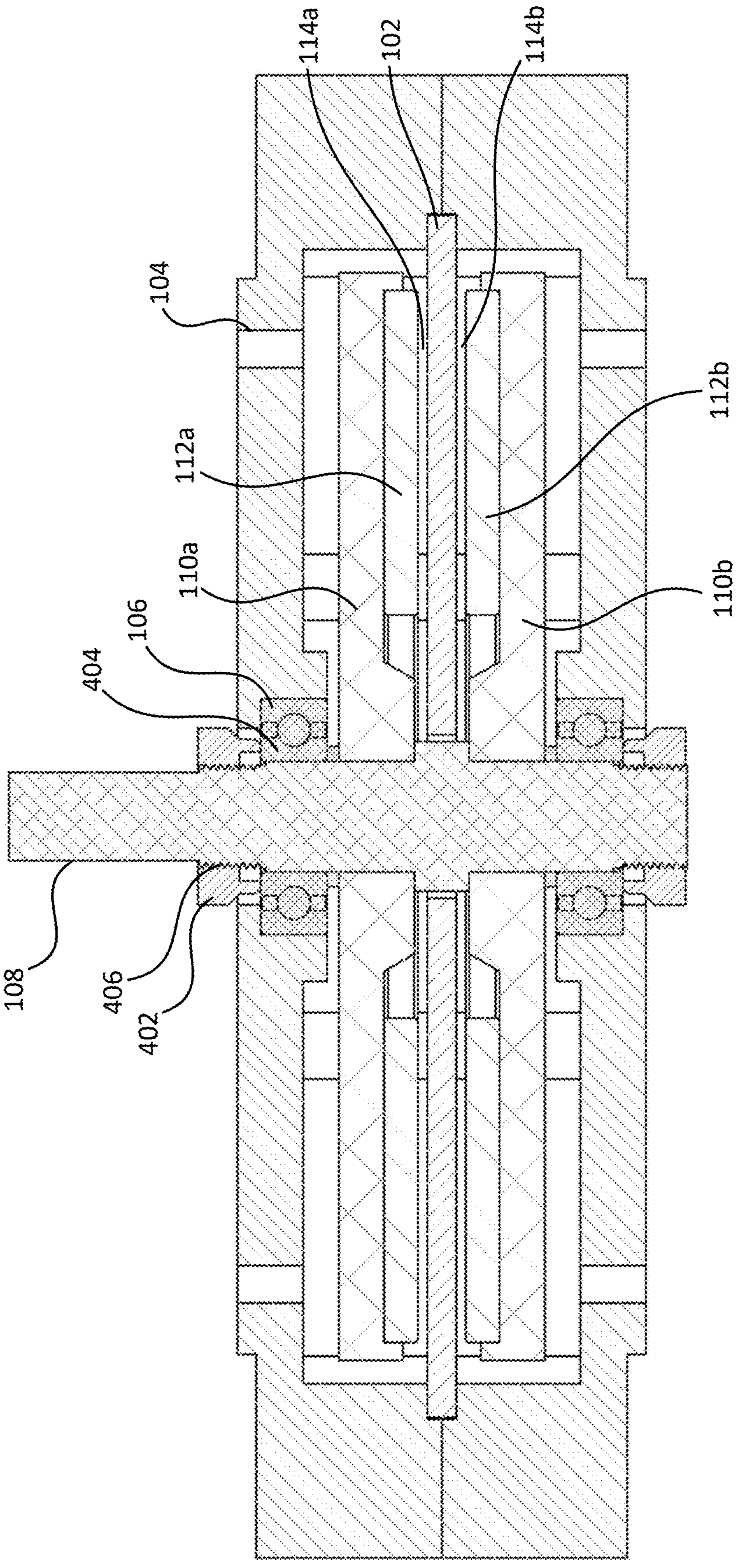
FIG. 4 shows a cross-section of a printed circuit board stator axial flux machine that has bearing nuts configured to engage threads on a shaft supporting rotor components to adjust the position of the shaft and rotor components relative to the bearings, allowing the stator to be centered in the gap.
Figure 5:
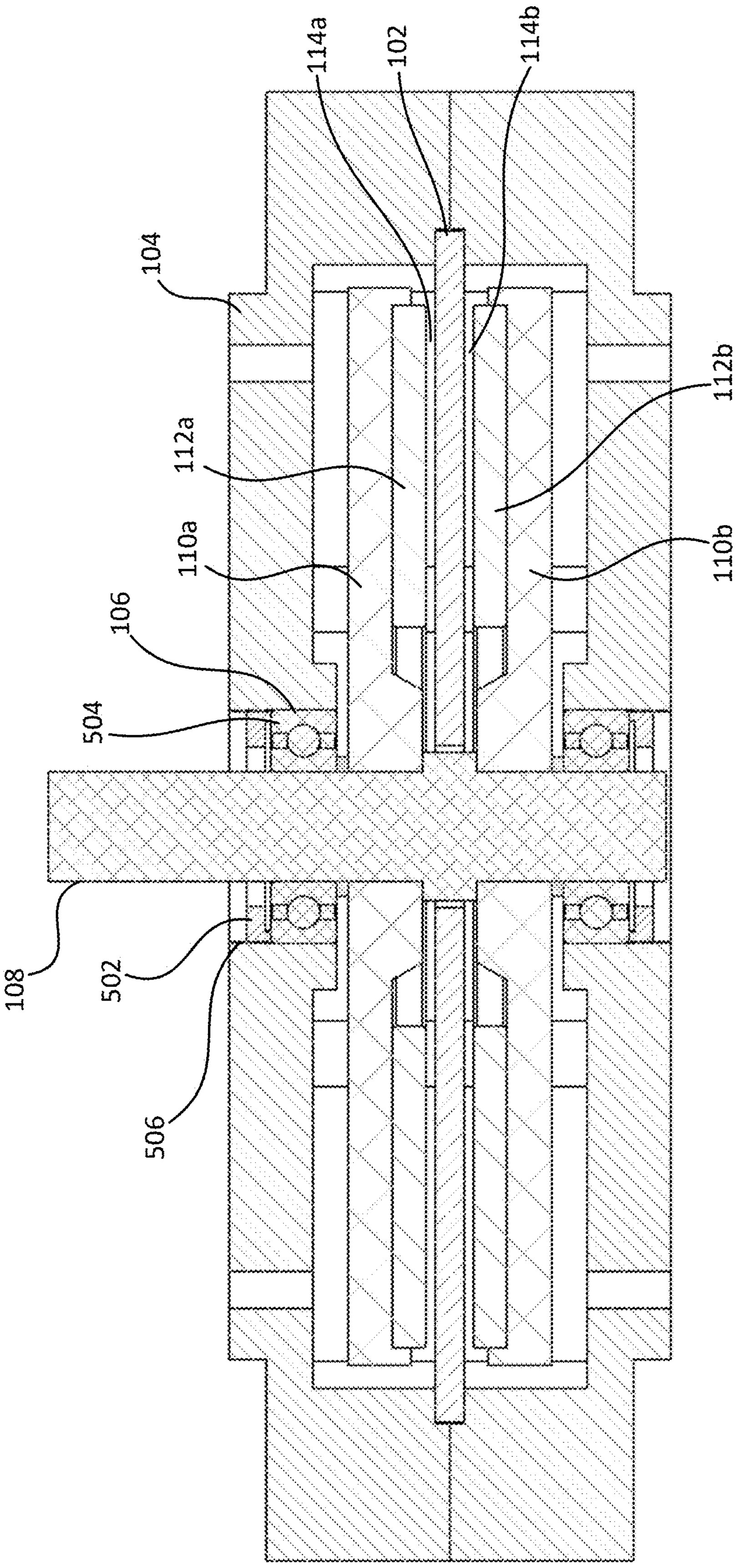
FIG. 5 shows a cross-section of a printed circuit board stator axial flux machine that has bearing nuts configured to engage threads on a housing supporting a stator to adjust the position of the housing and stator relative to the bearings, allowing the stator to be centered in the gap.

Another technique for addressing the situation is to make the bearings or their mounting surfaces adjustable, so that the axial location of the rotor components can be changed with respect to the stator. This effectively replaces several tight tolerance parts with an extra manufacturing step-centering the rotor/stator assemblies. There are many physical mechanisms for locating bearings axially. Bearing nuts and externally adjustable collars are among the standard solutions recommended by manufacturers. FIG. 4 illustrates one example configuration in which internally threaded bearing nuts 402 can be positioned on the shaft 108 of an axial flux machine to enable adjustment of a relative position of the rotor components and the PCB stator 102, by adjusting a position of the shaft 108 axially relative to inner races 404 of the bearings 106. As shown in FIG. 4, in some implementations, the shaft 108 may include threads 406 that are configured to engage with corresponding internal threads on the bearing nuts 402 to facilitate such adjustment. FIG. 5 illustrates an alternative configuration in which externally threaded bearing nuts 502 may instead be used adjust a relative position of the rotor components and the PCB stator 102, by adjusting a position of the housing 104 (which supports the stator 102) axially relative to outer races 504 of the bearings 106. As shown in FIG. 5, in some implementations, the housing 104 may include threads 506 that are configured to engage with corresponding external threads on the bearing nuts 502 to facilitate such adjustment.

Figure 6:
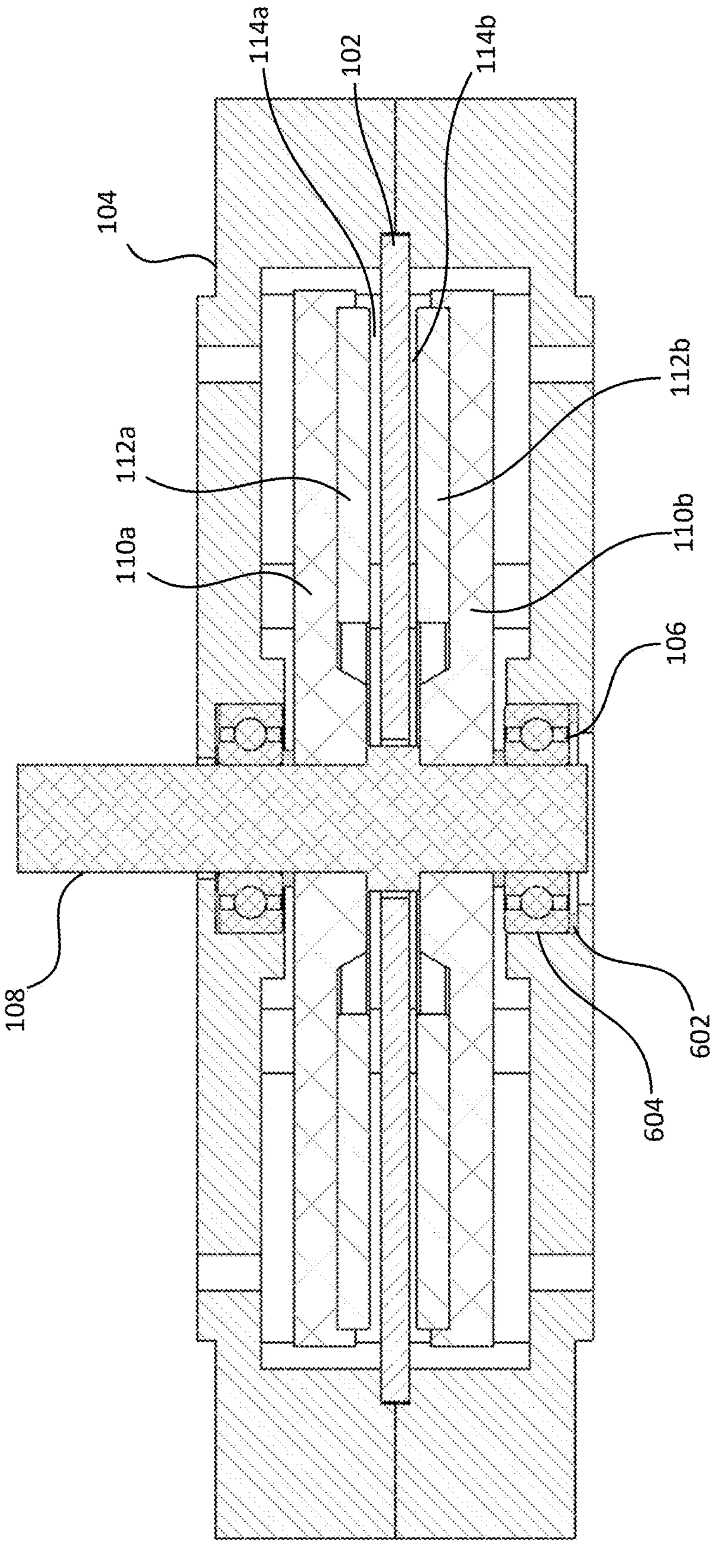
FIG. 6 shows a cross-section of a printed circuit board stator axial flux machine in which a shim is used to adjust the relative position of the stator and rotor, allowing the stator to be centered in the gap.

Alternatively, a simple shim may be used to adjust the position of the rotor components relative to the PCB stator 102. Again, this adjustment can apply to the shaft 108 relative to the bearings 106, or to the bearings 106 relative to the housing 104. FIG. 6 illustrates an example configuration in which a shim 602 is positioned between an outer race 604 of a bearing 106 and the housing 104 so as to adjust a position of the bearing/shaft/rotor assembly relative to the housing 104.

Methods for tightening or adjusting bearings are perhaps more commonly seen on tapered roller bearings or angular contact bearings for axial-position sensitive applications like machine tool spindles. Examples of such bearing retention and adjustment mechanisms and techniques that may be used to adjust the relative position between the rotor components and the stator of an axial flux machine are described, for instance, at the path "blog/bearing-all-holding-mounting-methods" of the uniform resource locator (URL) "us.misumi-ec.com," and the path "group/products/super-precision-bearings/principles/bearing-selection-process/bearing-interfaces/axial-location-of-bearing-rings" of the URL "skf.com," the entire contents of each of which are incorporated herein by reference. Traditional radial flux motors and generators are less sensitive to axial position than axial flux motors, but a variety of suitable methods for positioning assemblies with bearings will nonetheless be apparent to those skilled in the art.

If the expense of the machine will tolerate these adjustment mechanisms, the problem becomes knowing and/or optimizing the relative position of the rotor/stator assemblies inside the housing 104. This can be challenging because the housing 104 is typically designed to prevent access to the rotor and stator components.

There are two obvious solutions, or procedures, for achieving a centered gap with an adjustable bearing retention mechanism. A first solution involves: (i) loosening any adjustable bearing retention mechanism so that the rotors can move axially to interference with the stator in both directions, (ii) measuring rotor (i.e. shaft) position at the limit of motion in each direction axially, (iii) tightening the bearing retention mechanism to locate the rotors at the half-way point of the positions determined in step (ii). A second solution is to provide the case with one or more witness holes, so that the relationship between the rotor and stator can be directly observed. The bearing retention mechanism can then be adjusted while observing the gap on either side of the stator at the one or more angles corresponding to the witness holes. In either case, bearing preload and axial loading characteristics can be set by methods known those skilled in the art, such as applying a specific torque to the bearing nuts, arranging a spring to act on the bearing, or similar.

A drawback with the foregoing solutions is that they are not particularly easy to incorporate in a high-speed automated assembly. Additionally, and perhaps more importantly, the methods result in a mechanical center, i.e., the location in which the extreme points of interference clear equally on either side. It should be appreciated that even where the simple mechanical clearance between the rotor and stator surface is satisfied, there is an opportunity to refine rotor/stator position according to other criteria. These criteria provide a more refined and useful notion of the center location of the motor, and perhaps justify the cost of the adjusting hardware.

Of primary importance in some applications is the efficiency of the motor. When the rotor is placed too close to the stator on one side, this can cause deviations from modeled drag performance and a reduction in motor efficiency. Ideally, the minimum of rotor drag as a function of rotor position corresponds to the mechanical center of the stator. In practice, however, there is often an offset from the apparent mechanical center at which the drag is minimized. The corresponding location might be called the "minimum drag center."

Another issue of concern may be the capacitive coupling between the rotor and the stator winding. To a first order, the capacitive coupling may be approximated using the parallel plate formula, which assumes that the electric field is uniform in the gap and that the respective surfaces are equipotentials, i.e., $$C = \frac{\epsilon A}{d}$$

where A is the rotor area, $\epsilon$ is the permittivity of free space, and d is the separation between plates. In terms of a stator between two rotor components, there are two capacitors in parallel, and the separation between plates is constrained by the geometry. A model of the rotor-stator capacitance incorporating the idealized conditions of the parallel plate formula is $$C_{rs} = \frac{\epsilon A}{d+x} + \frac{\epsilon A}{d-x}$$

where x<d is the displacement from an idealized geometric center. The expression above has a minimum at x=0 and increases as the gap on either side, either d+x or d−x, goes zero. In practice the minimum capacitance center may be different than the apparent mechanical center and/or the minimum drag center.

In a permanent magnet axial flux machine where the stator material has a core, there may be, for at least some configurations, a "force center" or equilibrium position where the axial force(s) between the stator and rotor components balance to zero. For example, this will be a possibility in a rotor/stator/rotor configuration if the forces are equal and opposite. Away from the equilibrium, the force will increase dramatically. It may be desirable to minimize this force, for example, in the face of manufacturing tolerances and stack up. As in the other cases, the equilibrium position may not correspond precisely with other centers.

The difference between an optimal center, i.e., a center minimizing capacitance, drag, and/or squared force, and the mechanical center may be referred to as the "offset." For printed circuit board stator axial flux machines of a rotor-stator-rotor construction, the offset for machines of roughly 20 centimeter (cm) diameter can be on the order of 5 mils (~0.1 millimeters (mm)). If the stator position is established using feedback of the desired quantity (or quantities), it may be possible to set the machine to the optimal center with a tolerance well below the typical offset. In some implementations of the present disclosure, such a feedback loop may be constructed using (i) a mechanism that can measure the desired quantity (or quantities) accurately, and (ii) an effector that can adjust the position of the stator relative to the rotor to achieve the desired offset.

Figure 7:
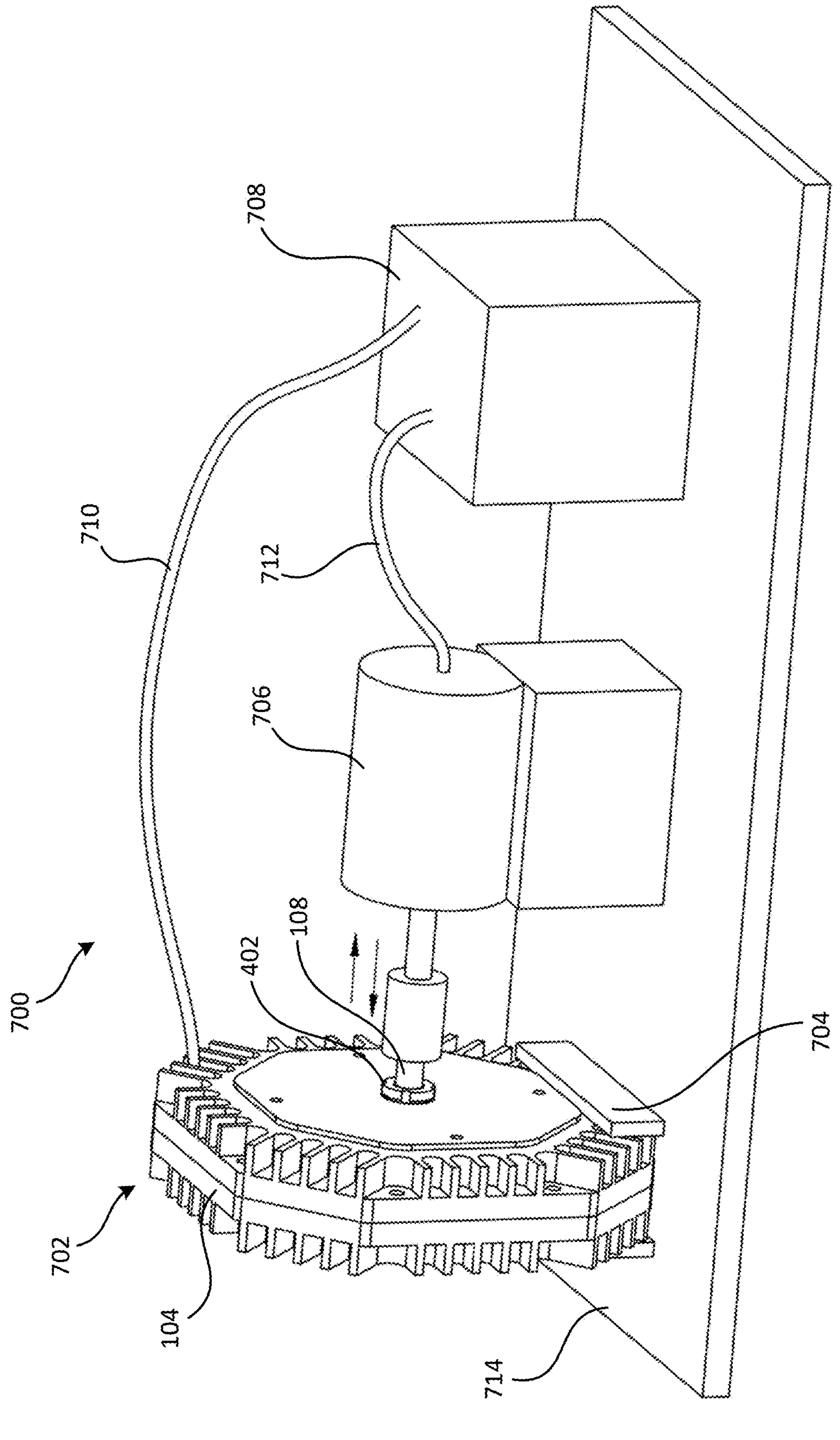
FIG. 7 shows a first example apparatus that may be used to adjust a position of a rotor assembly within an axial flux machine, in accordance with some embodiments of the present disclosure.

FIG. 7 shows a first example apparatus 700 that may determine an optimal center between rotor components of an axial flux machine 702 based on feedback. As shown, in some implementations, the apparatus 700 may include a frame 714 that supports each of a retention mechanism 704 for the axial flux machine 702, an actuator 706, and a feedback controller 708. Like the conventional axial flux machine 100 shown in FIG. 1, the axial flux machine 702 may include a stator (e.g., a PCB stator 102) that is fixedly attached to a housing 104, as well as a rotor assembly (e.g., including back iron components 110, magnets 112 and a shaft 108) that that is rotatable relative to the housing 104 (e.g., via bearings 106), so that the rotor assembly is rotatable relative to the stator. In the illustrated example, the stator (e.g., a PCB stator 102) and the rotor components (e.g., the back iron components 110 and the magnets 112) are disposed within the housing 104 and are thus not directly observable from outside the housing 104.

As shown in FIG. 7, the housing 104 of the axial flux machine 702 may be located in the fixed frame (e.g., by being affixed to the retention mechanism 704 of the frame 714) with respect to both translation and rotation of the rotor components (not visible in FIG. 7) and the shaft 108. The shaft 108 may be free to translate axially within the housing 104 because an adjustable bearing mechanism (e.g., a bearing nut 402, shim 602, etc.) has been set or otherwise configured (e.g., by loosening a bearing nut 402 or removing one or more shims 602) to allow axial movement. As also shown in FIG. 7, the feedback controller 708 may be connected to the stator (e.g., a PCB stator 102), which is mounted in the housing 104, electrically (e.g., via one or more cables 710). In some implementations, the feedback controller 708 may also measure force from the actuator 706 (e.g., via one or more cables 712), which may control the axial position of the rotor assembly relative to the stator (e.g., by adjusting an axial position of the shaft 108 relative to the housing 104). In some implementations, the feedback controller 708 may excite the motor (e.g., by applying current to one or more windings of the stator via the cable(s) 710 and/or by controlling the actuator 706 via the cable(s) 712 to cause the actuator 706 to spin and/or translate the shaft 108), and may use direct or indirect measurements of quantities of interest (e.g., received or measured via the cables 710 and/or the cables 712), such as drag, axial force, and/or stator/rotor capacitance, as a basis for controlling the actuator 706 to cause it to adjust the axial position of the shaft 108.

Measurements of quantities such as force, drag, and capacitance may be direct or indirect. To obtain a direct measurement for the axial force, for example, a load cell coupled with the actuator 706 could provide force feedback. Alternatively, the force might be indirectly measured by monitoring the effort required by the actuator 706 to move the rotor assembly relative to the stator. To measure capacitance, the feedback controller 708 may, for example, introduce an excitation signal in the form of a time-varying voltage with respect to the housing 104 to one or more of the phase connections of the stator. By monitoring the associated current, the stator to housing capacitance can be estimated using the relationship governing the current and voltage through a capacitor C, i.e., $$i_c = C\frac{d}{dt}v_c$$

Similarly, to measure rotor drag, a test signal may, for example, be introduced by controlling the axial flux machine 702, via the phase connections, to a particular test profile or excitation. For example, one such profile would be to control the rotor assembly to a nominal speed, set torque to zero, and monitor the decay of speed, and repeat. The equations of motion under the "coast" part of this excitation are $$J\frac{d^2}{dt^2}\theta + \beta\frac{d}{dt}\theta = 0$$

Or, in terms of speed $$\omega = \frac{d}{dt}\theta,$$

$$\frac{d}{dt}\omega = -\frac{\beta}{J}\omega$$

The time-constant of decay for this first-order ordinary differential equation exposes the drag coefficient β. Since speed and torque may be controlled via the phase connections, the feedback controller 708 or another controller connected to the axial flux machine 702 under test can easily infer drag without additional hardware. This is an example of an indirect measurement. It should be appreciated that the particular measurement techniques described herein are just examples of many possibilities in terms of modeling and design of experiments. Approaches of this kind are often particularly successful when measurements are available for coordinated sets of variables. For example, force and displacement, speed and torque, current and voltage, etc.

In some implementations, the feedback controller 708 may employ a control algorithm (e.g., to control the actuator 706 to adjust the position of the rotor assembly with respect to the stator) that seeks to minimize (or maximize) a feedback quantity or related convex function Q(x) as a function of x. The convex function Q(x) may, for example, include capacitance, squared force, drag, and/or other similar functions, and may have a minimum (or maximum)

$$\frac{\partial}{\partial x}Q(x) = 0$$

at the offset $x=x_0$. A possible dynamic control mechanism is the MIT rule (gradient descent), i.e., $$\frac{d}{dt}x = -\lambda\frac{\partial Q(x)}{\partial x}$$

If discretized, this rule will provide a sequence of position-control updates that will converge to the minimum (or maximum) value according to a user selected adaption rate parameter λ. The equilibrium value, which may be detected by a convergence test, corresponds to the minimum (or maximum) of Q(x) where the partial derivative goes to zero. Those skilled in the art will appreciate that the minimization (or maximization) of Q(x) can be approached by other methods, with attendant advantages and disadvantages. As a one-dimensional problem with good prior information, the solution can be found quickly. This, and the automatic adjustment of the rotor/stator gap, make the method amenable to continuous production.

Once feedback controller 708 and the actuator 706 have automatically positioned the rotor assembly relative to the stator (e.g., using a control algorithm of the type described above or otherwise), the apparatus 700 may hold the components of the axial flux machine 702 in place so as to allow the bearing locating mechanisms (e.g., the bearing nuts 402, shims 602, or the like) to be securely tightened, installed, etc. As the rotor assembly and stator remain in the apparatus 700 during this phase, the accuracy of the position during this phase can be monitored and validated by the feedback controller 708.

Figure 8:
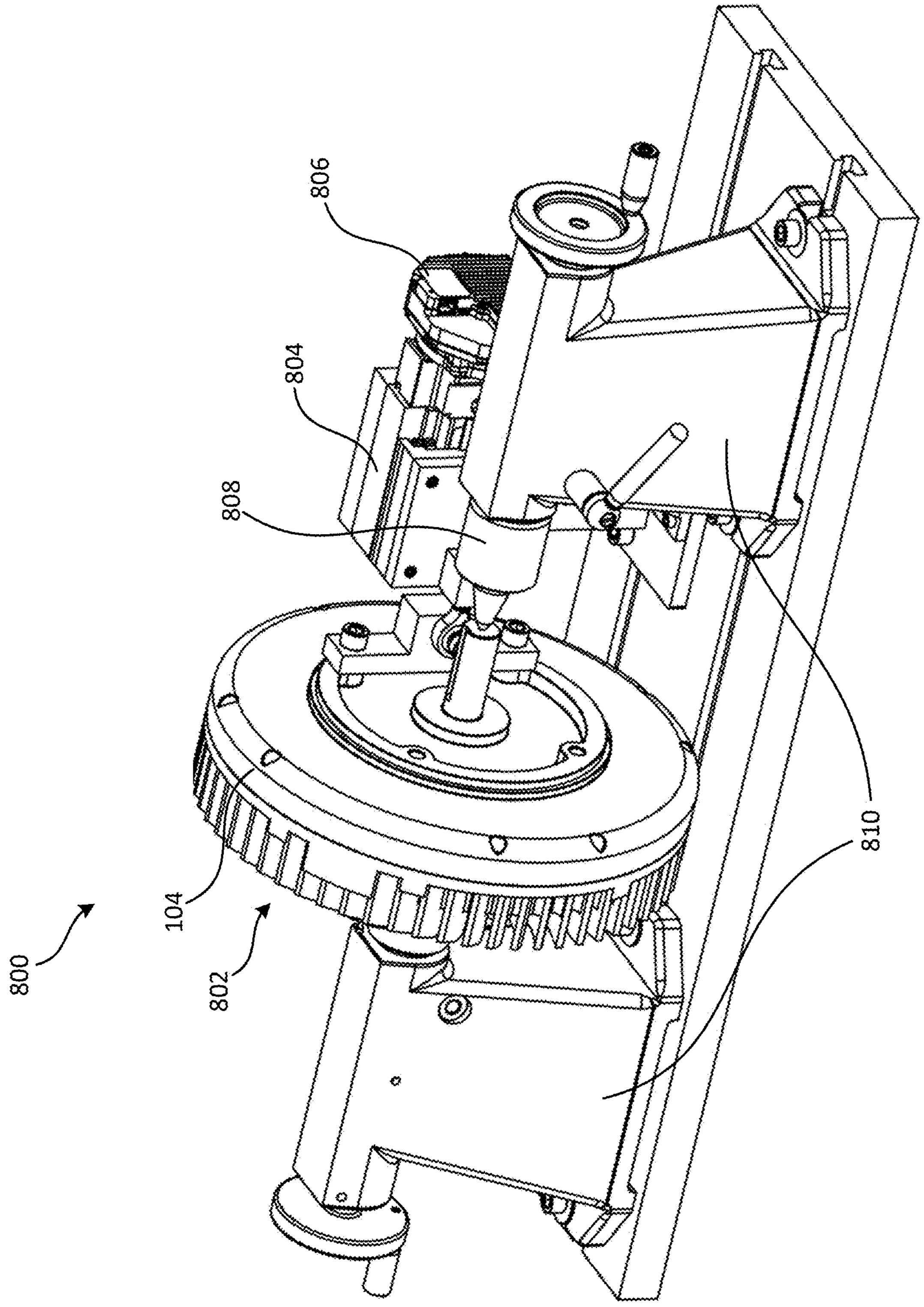
FIG. 8 shows a second example apparatus that may be used to adjust a position of a rotor assembly within an axial flux machine, in accordance with some embodiments of the present disclosure.

FIG. 8 shows a second example apparatus 800 that may determine an optimal center between a stator and rotor components of an axial flux machine 802 based on feedback. The apparatus 800 is similar to the apparatus 700 in many respects, but the relative motion of rotor assembly and stator are reversed, which may offer some practical advantages. As shown in FIG. 8, in the apparatus 800, the rotor assembly may be located axially and radially on live center bearings 808, and shaft support tailstocks 810 may be used to hold the rotor assembly in place via the live center bearings 808. The live center bearings 808 allow the rotor assembly to turn, e.g., for the purpose of measuring drag. A linear actuator 804 driven by a servo motor 806 may move the stator and housing 104 axially. The housing 104 may be otherwise constrained from rotating. As the shaft is free to rotate on centers, the stator within the housing 104 may be driven electrically. This may cause the motor to run, or signals may be introduced via the phase wires to perform other tests, such as for capacitance. In some implementations, the axial position control that minimizes Q(x) may be implemented by a controller of the servo motor 806. Alternatively, a supervisory computer system and human machine interface (not shown in FIG. 8), could perform the minimization aspect of the method.

Motors and generators that have been "centered" according to the methods described herein may display increased performance compared to their mechanically centered counterparts. The application and design will determine the significance of the improvement. Other benefits may include that the tolerances on parts determining the relative position of the rotor and stator may be relaxed. Parts may be simplified compared to solutions involving a witness hole. Additionally, the centering procedure tests several important aspects of motor operation that would otherwise have to be done in quality control.

Axial flux machines assembled using the techniques described herein here may be difficult to discern from motors assembled to their mechanical center, in a casual sense. This would certainly be true, for example, if the machines happen to have optimal centers that coincide to significant degree with their geometric centers, i.e., they are extremely consistent and precise. However, a statistical analysis of a group of axial flux machines (possibly tested using the instrumentation described herein) may be able to establish, with a degree of certainty, that the machines were assembled in a manner to optimize drag, efficiency, capacitance and/or force.

The following clauses describe example implementations of apparatuses and methods in accordance with some aspects of the present disclosure.

Clause 1. An axial flux machine, comprising a rotor and a stator that are configured and arranged to have an adjustable gap between the rotor and the stator, wherein the adjustable gap is adjusted to optimize force, force magnitude, drag torque, rotor to stator capacitance, and/or to maximize efficiency, while maintaining a non-interfering clearance between the rotor and the stator.

Clause 2. The axial flux machine of clause 1, wherein the stator includes a printed circuit board stator.

Clause 3. A method of configuring an axial flux machine, comprising: deriving or measuring quantities from the axial flux machine; and using a feedback system to adjust a gap between a rotor and a stator of the axial flux machine based on the quantities.

Clause 4. The method of clause 3, wherein the stator includes a printed circuit board stator.

Clause 5. The method of clause 3 or claim 4, wherein the quantities include an axial force.

Clause 6. The method of any of clauses 3-5, wherein the quantities include capacitance.

Clause 7. The method of any of clauses 3-6, wherein the quantities include drag torque.

Clause 8. The method of any of clauses 3-7, further comprising: after using the feedback system to adjust the gap, fixing at least one bearing of the axial flux machine in place to maintain a size of the gap.

Clause 9. An apparatus, comprising: at least one controller configured to derive or measure quantities from an axial flux machine and to adjust a gap between a rotor and a stator of the axial flux machine based on the quantities.

Clause 10. The apparatus of clause 9, wherein the stator includes a printed circuit board stator.

Clause 11. The apparatus of clause 9 or claim 9, wherein the quantities include an axial force.

Clause 12. The apparatus of any of clauses 9-11, wherein the quantities include capacitance.

Clause 13. The apparatus of any of clauses 9-12, wherein the quantities include drag torque.

Clause 14. The apparatus of any of clauses 9-13, wherein: the stator and a housing of the axial flux machine are in a fixed frame and components of the rotor are in a moving frame; and the at least one controller is further configured to cause components of the rotor to translate axially to determine an optimal location of the components of the rotor relative to the stator.

Clause 15. The apparatus of any of clauses 9-13, wherein: the stator and a housing of the axial flux machine are in a moving frame and components of the rotor are in a fixed frame; and the at least one controller is further configured to cause the stator and the housing to translate axially to determine an optimal location of the components of the rotor relative to the stator.

Clause 16. The apparatus of any of clauses 9-15, wherein the apparatus is configured to cause the rotor to rotate while the quantities are being derived or measured.

Clause 17. A method, comprising: measuring at least a first operational parameter of a rotary energy conversion device including a first rotor component and a stator component; determining a value of a function that is based at least in part on the first operational parameter, the function having a local extremum; and adjusting a relative position of the first rotor component and the stator component until the value is substantially equal to the local extremum.

Clause 18. The method of clause 17, wherein: the rotary energy conversion device further includes a second rotor component; and the stator component is disposed in a gap between the first rotor component and the second rotor component.

Clause 19. The method of clause 18, wherein: the first rotor component includes at least a first permanent magnet; and the second rotor component includes at least a second permanent magnet.

Clause 20. The method of clause 18 or clause 19, wherein a first distance between the first rotor component and the stator component is different than a second distance between the second rotor component and the stator component when the value is substantially equal to the local extremum.

Clause 21. The method of any of clauses 18-20, further comprising: after the value is substantially equal to the local extremum, fixing at least one bearing of the rotary energy conversion device in place to maintain a size of the gap.

Clause 22. The method of any of clauses 17-21, wherein the rotary energy conversion device is an axial flux motor or generator.

Clause 23. The method of any of clauses 17-22, wherein the stator component includes a printed circuit board stator.

Clause 24. The method of any of clauses 17-23, wherein the first operational parameter is indicative of drag torque between the first rotor component and the stator component.

Clause 25. The method of any of clauses 17-23, wherein the first operational parameter is indicative of capacitance between the first rotor component and the stator component.

Clause 26. The method of any of clauses 17-23, wherein the first operational parameter is indicative of axial force between the first rotor component and the stator component.

Clause 27. An apparatus, comprising: at least one controller configured to determine at least a first operational parameter of a rotary energy conversion device including a first rotor component and a stator component, and to determine a value of a function that is based at least in part on the first operational parameter, the function having a local extremum; and an actuator configured to adjust a relative position of the first rotor component and the stator component until the value is substantially equal to the local extremum.

Clause 28. The apparatus of clause 27, wherein: the rotary energy conversion device further includes a second rotor component; and the stator component is disposed in a gap between the first rotor component and the second rotor component.

Clause 29. The apparatus of clause 28, wherein: the first rotor component includes at least a first permanent magnet; and the second rotor component includes at least a second permanent magnet.

Clause 30. The apparatus of clause 28 or clause 29, wherein the actuator is configured to adjust the relative position between the first rotor component and the stator component so that a first distance between the first rotor component and the stator component is different than a second distance between the second rotor component and the stator component when the value is substantially equal to the local extremum.

Clause 31. The apparatus of any of clauses 27-30, wherein the rotary energy conversion device is an axial flux motor or generator.

Clause 32. The apparatus of any of clauses 27-31, wherein the stator component includes a printed circuit board stator.

Clause 33. The apparatus of any of any of clauses 27-32, wherein the first operational parameter is indicative of drag torque between the first rotor component and the stator component.

Clause 34. The apparatus of any of clauses 27-32, wherein the first operational parameter is indicative of capacitance between the first rotor component and the stator component.

Clause 35. The apparatus of any of clauses 27-32, wherein the first operational parameter is indicative of axial force between the first rotor component and the stator component.

Clause 36. The apparatus of any of clauses 27-32, wherein: the stator component and a housing of the rotary energy conversion device are in a fixed frame and the first rotor component is in a moving frame; and the at least one controller is further configured to control that actuator to cause the first rotor component to translate axially until the value is substantially equal to the local extremum.

Clause 37. The apparatus of any of clauses 27-32, wherein: the stator component and a housing of the rotary energy conversion device are in a moving frame and the first rotor component is in a fixed frame; and the at least one controller is further configured to control that actuator to cause the stator component and the housing to translate axially until the value is substantially equal to the local extremum.

Clause 38. A rotary energy conversion device, comprising: a rotor including a first rotor component and a second rotor component; and a stator component disposed in a gap between the first rotor component and the second rotor component, wherein: a first distance between the first rotor component and the stator component is different than a second distance between the second rotor component and the stator component; and the stator component is positioned within the gap so that a value of a function that is based at least in part on an operational parameter the rotary energy conversion device, where the operational parameter is dependent on a position of the stator component within the gap, is substantially equal to a local extremum of the function.

Clause 39. The rotary energy conversion device of clause 38, wherein the rotary energy conversion device is an axial flux motor or generator.

Clause 40. The rotary energy conversion device of clause 38 or 39, wherein the stator component includes a printed circuit board stator.

Clause 41. The rotary energy conversion device of any of clauses 38-40, wherein: the first rotor component includes at least a first permanent magnet; and the second rotor component includes at least a second permanent magnet.

Clause 42. The rotary energy conversion device of any of clauses 38-41, wherein the operational parameter is indicative of drag torque between the first rotor component and the stator component.

Clause 43. The rotary energy conversion device of any of clauses 38-41, wherein the operational parameter is indicative of capacitance between the first rotor component and the stator component.

Clause 44. The rotary energy conversion device of any of clauses 38-41, wherein the operational parameter is indicative of axial force between the first rotor component and the stator component.

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the spirit and scope of the disclosure. Accordingly, the foregoing description and drawings are by way of example only.

Various aspects of the present disclosure may be used alone, in combination, or in a variety of arrangements not specifically discussed in the embodiments described in the foregoing and is therefore not limited in this application to the details and arrangement of components set forth in the foregoing description or illustrated in the drawings. For example, aspects described in one embodiment may be combined in any manner with aspects described in other embodiments.

Also, the disclosed aspects may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc. in the claims to modify a claim element does not by itself connote any priority, precedence or order of one claim element over another or the temporal order in which acts of a method are performed, but are used merely as labels to distinguish one claimed element having a certain name from another element having a same name (but for use of the ordinal term) to distinguish the claim elements.

Also, the phraseology and terminology used herein is used for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method, comprising:

measuring at least a first operational parameter of a rotary energy conversion device including a first rotor component, a second rotor component, and a stator component disposed in a gap between the first rotor component and the second rotor component;

determining a value of a function that is based at least in part on the first operational parameter, the function having a local extremum; and adjusting a relative position of the first rotor component and the stator component until the value is substantially equal to the local extremum;

wherein a first distance between the first rotor component and the stator component is different than a second distance between the second rotor component and the stator component when the value is substantially equal to the local extremum.

2. The method of claim 1, wherein:

the rotary energy conversion device further includes a second rotor component; and the stator component is disposed in a gap between the first rotor component and the second rotor component.

3. The method of claim 2, wherein the rotary energy conversion device is an axial flux motor or generator.

4. The method of claim 3, wherein the stator component includes a printed circuit board stator.

5. The method of claim 3, wherein:

the first rotor component includes at least a first permanent magnet; and the second rotor component includes at least a second permanent magnet.

6. The method of claim 1, wherein the first operational parameter is indicative of axial force between the first rotor component and the stator component.

7. A method comprising:

measuring at least a first operational parameter of a rotary energy conversion device including a first rotor component, a second rotor component, and a stator component disposed in a gap between the first rotor component and the second rotor component;

determining a value of a function that is based at least in part on the first operational parameter, the function having a local extremum;

adjusting a relative position of the first rotor component and the stator component until the value is substantially equal to the local extremum; and after the value is substantially equal to the local extremum, fixing at least one bearing of the rotary energy conversion device in place to maintain a first set distance between the first rotor component and the stator component and a second set distance between the second rotor component and the stator component.

8. The method of claim 7, wherein:

the rotary energy conversion device is an axial flux motor or generator; and the stator component includes a printed circuit board stator.

9. A method, comprising:

measuring at least a first operational parameter of a rotary energy conversion device including a first rotor component and a stator component;

determining a value of a function that is based at least in part on the first operational parameter, the function having a local extremum; and adjusting a relative position of the first rotor component and the stator component until the value is substantially equal to the local extremum;

wherein the first operational parameter is indicative of drag torque between the first rotor component and the stator component.

10. A method, comprising:

measuring at least a first operational parameter of a rotary energy conversion device including a first rotor component and a stator component;

determining a value of a function that is based at least in part on the first operational parameter, the function having a local extremum; and adjusting a relative position of the first rotor component and the stator component until the value is substantially equal to the local extremum;

wherein the first operational parameter is indicative of capacitance between the first rotor component and the stator component.

11. An apparatus, comprising:

at least one controller configured to determine at least a first operational parameter of a rotary energy conversion device including a first rotor component, a second rotor component, and a stator component disposed in a gap between the first rotor component and the second rotor component, and to determine a value of a function that is based at least in part on the first operational parameter, the function having a local extremum; and an actuator configured to adjust a relative position of the first rotor component and the stator component until the value is substantially equal to the local extremum, wherein the actuator is configured to adjust the relative position between the first rotor component and the stator component so that a first distance between the first rotor component and the stator component is different than a second distance between the second rotor component and the stator component when the value is substantially equal to the local extremum.

12. The apparatus of claim 11, wherein the rotary energy conversion device is an axial flux motor or generator.

13. The apparatus of claim 12, wherein the stator component includes a printed circuit board stator.

14. The apparatus of claim 12, wherein:

the first rotor component includes at least a first permanent magnet; and the second rotor component includes at least a second permanent magnet.

15. The apparatus of claim 11, wherein the first operational parameter is indicative of axial force between the first rotor component and the stator component.

16. The apparatus of claim 11, wherein:

the actuator is supported by a frame;

the stator component is restrained from moving, relative to the frame, in a direction parallel to an axis of rotation of the first rotor component and the first rotor component is movable, relative to the frame, in the direction parallel to the axis of rotation; and the at least one controller is further configured to control that actuator to cause the first rotor component to translate, relative to the frame, in the direction parallel to the axis of rotation until the value is substantially equal to the local extremum.

17. The apparatus of claim 11, wherein:

the actuator is supported by a frame;

the stator component is movable, relative to the frame, in a direction parallel to an axis of rotation of the first rotor component and the first rotor component is restrained from moving, relative to the frame, in the direction parallel to the axis of rotation; and the at least one controller is further configured to control that actuator to cause the stator component to translate, relative to the frame, in the direction parallel to the axis of rotation until the value is substantially equal to the local extremum.

18. An apparatus, comprising:

at least one controller configured to determine at least a first operational parameter of a rotary energy conversion device including a first rotor component and a stator component, and to determine a value of a function that is based at least in part on the first operational parameter, the function having a local extremum; and an actuator configured to adjust a relative position of the first rotor component and the stator component until the value is substantially equal to the local extremum;

wherein the first operational parameter is indicative of drag torque between the first rotor component and the stator component.

19. The apparatus of claim 18, wherein:

the rotary energy conversion device further includes a second rotor component; and the stator component is disposed in a gap between the first rotor component and the second rotor component.

20. The apparatus of claim 19, wherein the actuator is configured to adjust the relative position between the first rotor component and the stator component so that a first distance between the first rotor component and the stator component is different than a second distance between the second rotor component and the stator component when the value is substantially equal to the local extremum.

21. An apparatus, comprising:

at least one controller configured to determine at least a first operational parameter of a rotary energy conversion device including a first rotor component and a stator component, and to determine a value of a function that is based at least in part on the first operational parameter, the function having a local extremum; and an actuator configured to adjust a relative position of the first rotor component and the stator component until the value is substantially equal to the local extremum;

wherein the first operational parameter is indicative of capacitance between the first rotor component and the stator component.

22. A rotary energy conversion device, comprising:

a rotor including a first rotor component and a second rotor component; and a stator component disposed in a gap between the first rotor component and the second rotor component, wherein:

a first distance between the first rotor component and the stator component is different than a second distance between the second rotor component and the stator component; and the stator component is positioned within the gap so that a value of a function that is based at least in part on an operational parameter of the rotary energy conversion device, where the operational parameter is dependent on a position of the stator component within the gap, is substantially equal to a local extremum of the function.

23. The rotary energy conversion device of claim 22, wherein the rotary energy conversion device is an axial flux motor or generator.

24. The rotary energy conversion device of claim 23, wherein the stator component includes a printed circuit board stator.

25. The rotary energy conversion device of claim 24, wherein:

the first rotor component includes at least a first permanent magnet; and the second rotor component includes at least a second permanent magnet.

26. The rotary energy conversion device of claim 22, wherein the operational parameter is indicative of drag torque between the first rotor component and the stator component.

27. The rotary energy conversion device of claim 22, wherein the operational parameter is indicative of capacitance between the first rotor component and the stator component.

28. The rotary energy conversion device of claim 22, wherein the operational parameter is indicative of axial force between the first rotor component and the stator component.

* * * * *